(12) United States Patent
Bilgrami

(10) Patent No.: US 11,588,830 B1
(45) Date of Patent: Feb. 21, 2023

(54) USING MACHINE LEARNING TO DETECT MALICIOUS UPLOAD ACTIVITY

(71) Applicant: Sequoia Benefits and Insurance Services, LLC, San Mateo, CA (US)

(72) Inventor: Syed Ali Bilgrami, Gilbert, AZ (US)

(73) Assignee: Sequoia Benefits and Insurance Services, LLC, San Mateo, CA (US)

( * ) Notice: Subject to any disclaimer, the term of this patent is extended or adjusted under 35 U.S.C. 154(b) by 283 days.

(21) Appl. No.: 16/916,572

(22) Filed: Jun. 30, 2020

(51) Int. Cl.
*H04L 9/40* (2022.01)
*G06N 20/00* (2019.01)
*G06K 9/62* (2022.01)
*G06N 3/08* (2023.01)

(52) U.S. Cl.
CPC .......... *H04L 63/1416* (2013.01); *G06K 9/626* (2013.01); *G06K 9/6218* (2013.01); *G06N 3/08* (2013.01); *G06N 20/00* (2019.01); *H04L 63/145* (2013.01)

(58) Field of Classification Search
CPC ... H04L 63/1416; H04L 63/145; G06N 20/00; G06N 3/08; G06K 9/6218; G06K 9/626
See application file for complete search history.

(56) References Cited

U.S. PATENT DOCUMENTS

| | | | |
|---|---|---|---|
| 9,699,205 B2* | 7/2017 | Muddu | G06F 40/134 |
| 2015/0128263 A1* | 5/2015 | Raugas | H04L 63/1433 726/23 |
| 2017/0063896 A1* | 3/2017 | Muddu | H04L 43/062 |
| 2019/0294792 A1* | 9/2019 | Singh | G06K 9/6281 |
| 2021/0240825 A1* | 8/2021 | Kutt | G06F 8/42 |
| 2021/0240826 A1* | 8/2021 | Kutt | G06N 20/00 |
| 2021/0243149 A1* | 8/2021 | Schneider | H04L 51/222 |
| 2021/0256070 A1* | 8/2021 | Tran | G06F 16/90332 |
| 2021/0258791 A1* | 8/2021 | Jochem Sanz | H04W 12/66 |
| 2021/0271753 A1* | 9/2021 | Putman | G06N 3/063 |
| 2021/0273949 A1* | 9/2021 | Howlett | H04L 63/105 |
| 2021/0281590 A1* | 9/2021 | Maha | H04L 43/20 |
| 2021/0297422 A1* | 9/2021 | McDorman | H04L 63/107 |
| 2021/0320934 A1* | 10/2021 | Wosotowsky | H04L 63/0236 |
| 2021/0326436 A1* | 10/2021 | West | G06F 21/554 |
| 2022/0114262 A1* | 4/2022 | Bhatia | G06F 21/577 |

(Continued)

OTHER PUBLICATIONS

International Search Report and Written Opinion dated Oct. 6, 2021, on application No. PCT/US2021/038965.

*Primary Examiner* — Joseph P Hirl
*Assistant Examiner* — Stephen T Gundry
(74) *Attorney, Agent, or Firm* — Lowenstein Sandler LLP

(57) ABSTRACT

A method for training a machine learning model using information pertaining to characteristics of upload activity performed at one or more client devices includes generating first training input including (i) information identifying first amounts of data uploaded during a specified time interval for one or more of multiple application categories, and (ii) information identifying first locations external to a client device to which the first amounts of data are uploaded. The method includes generating a first target output that indicates whether the first amounts of data uploaded to the first locations correspond to malicious or non-malicious upload activity. The method includes providing the training data to train the machine learning model on (i) a set of training inputs including the first training input, and (ii) a set of target outputs including the first target output.

23 Claims, 5 Drawing Sheets

(56) References Cited

U.S. PATENT DOCUMENTS

| | | | |
|---|---|---|---|
| 2022/0116736 A1* | 4/2022 | Williams | A61B 5/4842 |
| 2022/0126864 A1* | 4/2022 | Moustafa | B60W 60/00274 |
| 2022/0129334 A1* | 4/2022 | Khare | G06F 9/45558 |
| 2022/0130501 A1* | 4/2022 | Keith, Jr. | G06F 21/35 |
| 2022/0138300 A1* | 5/2022 | Manjunath | A61B 5/117 |
| | | | 340/575 |
| 2022/0139546 A1* | 5/2022 | Manjunath | H04L 9/3231 |
| | | | 705/2 |
| 2022/0161815 A1* | 5/2022 | Van Beek | G06T 9/00 |

* cited by examiner

USING MACHINE LEARNING TO DETECT MALICIOUS UPLOAD ACTIVITY

TECHNICAL FIELD

Aspects and embodiments of the disclosure relate to data processing, and more specifically, to training a machine learning model and using a trained machine learning model to detect malicious upload activity.

BACKGROUND

Malicious software is often referred to as malware. Malware can include various types such as spyware, ransomware, viruses, worms, Trojan horses, adware or any type of malicious code that infiltrates a computer system.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure is a method for training a machine learning model using information pertaining to characteristics of upload activity performed at one or more client devices, the method comprising: generating training data to train the machine learning model, wherein generating the training data comprises: generating first training input, the first training input comprising (i) information identifying first amounts of data uploaded during a specified time interval for one or more of a plurality of application categories, and (ii) information identifying first locations external to a client device to which the first amounts of data are uploaded, wherein each of the one or more application categories comprise one or more applications that are installed at the client device and that upload the first amounts of data; and generating a first target output for the first training input, wherein the first target output indicates whether the first amounts of data uploaded to the first locations correspond to malicious or non-malicious upload activity; and providing the training data to train the machine learning model on (i) a set of training inputs comprising the first training input, and (ii) a set of target outputs comprising the first target output.

A further aspect of the disclosure is a method for using a trained machine learning model with respect to information pertaining to characteristics of upload activity performed at a client device, the method comprising: providing to the trained machine learning model first input comprising (i) information identifying first amounts of data uploaded during a specified time interval for one or more of a plurality of application categories, and (ii) information identifying first locations external to the client device to which the first amounts of data are uploaded, wherein each of the plurality of application categories comprise one or more applications that are installed at the client device and that upload the first amounts of data; and obtaining, from the trained machine learning model, one or more outputs identifying (i) an indication of the first amounts of data uploaded to the first locations for each of the one or more application categories, and (ii) for each of the one or more application categories, a level of confidence that the first amounts of data uploaded to the first locations correspond to a malicious upload activity.

A further aspect of the disclosure provides a system comprising: a memory; and a processing device, coupled to the memory, the processing device to perform a method according to any aspect or embodiment described herein. A further aspect of the disclosure provides a computer-readable medium comprising instructions that, responsive to execution by a processing device, cause the processing device to perform operations comprising a method according to any aspect or embodiment described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

DETAILED DESCRIPTION

Figure 1:
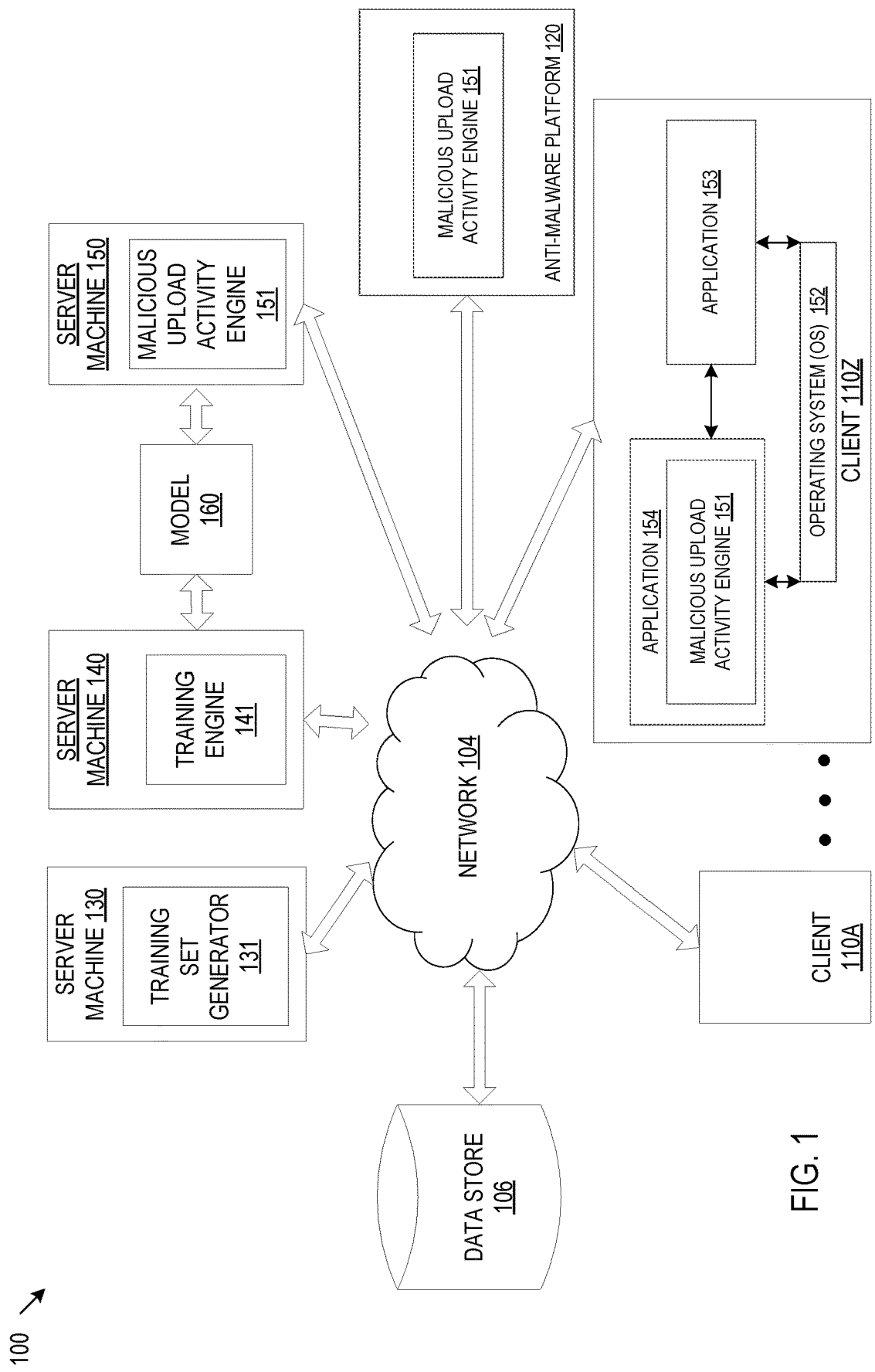
FIG. 1 illustrates an example system architecture, in accordance with some embodiments of the disclosure.

Malware can include malicious software that is specifically designed to disrupt, damage, or gain unauthorized access to a computer system. Some types of malware, such as spyware, can be used to execute malware attacks that perform malicious upload activity. Malicious upload activity can refer to an unauthorized upload of data from a client device to an external location where the upload activity is unauthorized by a user or is performed against the interest of the user. Non-malicious upload activity can refer to the authorized upload of data from a client device to an external location where the upload activity is authorized by the user.

Malicious upload activity can cause uploads of user information from a client device, such as a mobile device, to some untrusted external location, such as an external server. Often, the unauthorized upload of user information can include the upload of personal or sensitive information that is used by a third-party for malicious purposes. Malware computer code can be unwittingly downloaded or installed at a client device, after which the malware launches malware attacks to perform unauthorized uploads of user information. Some malware, such as non-malware, can use existing software (e.g., allowed or trusted applications or authorized protocols) installed at a client device to perform unauthorized uploads. Non-malware is capable of unauthorized uploads without downloading malicious files to the persistent storage of a client device. For example, non-malware code can use legitimate processes of a trusted software application installed at a client device to perform malicious attacks. Malware, and in particular non-malware, can be challenging to detect by some anti-malware applications at least because such malware can have limited to no signatures that are used to detect the presence of malware. Aspects of the disclosure address the above-mentioned and other challenges by generating training data for a machine learning model where the training data includes information pertaining to characteristics of upload activity performed at one or more client devices.

In some embodiments, training data can be generated at an application category level. An application category can refer to a grouping of one or more applications based on one or more features, such as the purpose of an application (e.g., function or subject matter of an application). For example, in some embodiments the training input can include first training input that includes one or more of (i) information identifying first amounts of data uploaded during a first specified time interval for one or more application categories, (ii) information identifying the first locations external to a client device to which the first amounts of data are uploaded, (iii) information identifying data categories corresponding to the first amounts of data uploaded during the first specified time interval for each of the one or more application categories, (iv) information identifying a frequency of upload activity that corresponds to uploading the first amounts of data during the first specified time interval for each of the one or more application categories. The first training input can correspond to a first target output that indicates whether the first amounts of data uploaded to the first locations correspond to malicious or non-malicious upload activity.

For example, the first training input can identify for a social networking application category that a client device uploads 45 megabytes (MB) of data per day to a location identified by the resource locator XYZ. The data categories of the uploaded data included image data, video data, and location data, and the upload frequency can be 5 times per day for the social networking application category. The first training input can correspond to a first target output that indicates that the 45 MB of data uploaded per day to the location identified by resource locator XYZ is non-malicious upload activity.

In some embodiments, the training input can be generated at an application level for one or more applications installed at the client device. The training input generated at an application-level can be similar to the training input generated at an application category level. For example, a second training input can identify that for application X a client device uploads 5 megabytes (MB) of data per day to a location identified by the resource locator X. The data categories of the uploaded data include video data and the upload frequency is 6 times per day for application X. The second training input can correspond to a second target output that indicates uploaded activity of application X is malicious upload activity.

In some embodiments, the training input can be generated at a client device level. The training input generated at a client device level can be similar to the training input generated at an application category level. For example, a third training input can identify that client device Y uploads 1.2 gigabytes (GB) of data per day to locations identified by the resource locators X, XYZ, and ABC. The data categories of the uploaded data include video data, image data, location data, and browser data, and the upload frequency is 15 times per day for client device Y. The third training input can correspond to a third target output that indicates uploaded activity of the client device Y is non-malicious upload activity.

In some embodiments, the training data can be associated with a particular type of device, a particular operating system (OS) (e.g., OS type), or a combination thereof. For example, the device type training data can be generated from multiple client devices of a mobile phone device type. The device type training data can be used to train a device type-specific machine learning model. In another example, the training data can be generated from multiple client devices having a particular OS type, such as mobile OS X. The OS type training data can be used to train an OS type-specific machine learning model.

In some embodiments, the training data can be generated using information from multiple client devices associated with multiple users. The "non-user-specific" training data can be used train a non-user-specific machine learning model. If enough user-specific training data is available (e.g., training data corresponding to one or more client devices associated with a specific user), the "user-specific" training data can be used to train a "user-specific" machine learning model. In some embodiments, once a threshold amount of user-specific training data is generated a non-user specific trained machine learning model (or a user-specific trained machine learning model) can be retrained using user-specific training data corresponding to one or more client devices associated with a specific user to generate a user-specific machine learning model.

Aspects of the disclosure address the above-mentioned and other challenges by using a trained machine learning model using input information pertaining to characteristics of upload activity performed at a particular client device.

In some embodiments, the input to the trained machine learning model can include one or more of application category level input information, application level input information, or client device level input information. For example, in some embodiments input to the trained machine learning model includes one or more of (i) information identifying first amounts of data uploaded during a specified time interval for one or more application categories, and (ii) information identifying first locations external to the client device to which the first amounts of data are uploaded, (iii) information identifying data categories corresponding to the first amounts of data uploaded during the specified time interval for each of the one or more application categories, (iv) information identifying a frequency of upload activity that corresponds to uploading the first amounts of data during the specified time interval for each of the one or more application categories.

In some embodiments, for any of the one or more application categories, whether the level of confidence satisfies a threshold level of confidence is determined. Responsive to determining that the level of confidence for a particular application category satisfies the threshold level of confidence, a remedial action is performed with respect to the malicious upload activity associated with the particular application category.

For example, a trained machine learning model can be part of an anti-malware application executing at a client device. The anti-malware can periodically query the OS of the client device or individual applications of the client device for information pertaining to characteristics of upload activity performed at the client device. The information can be used as input to the trained machine learning model. The trained machine learning model can make predictions as to whether the current upload activity at the client device is malicious upload activity or non-malicious upload activity. Responsive to determining that some upload activity at the client device is malicious upload activity, the anti-malware application can perform one or more remedial actions. For instance, the anti-malware application can generate a graphical user interface (GUI) that is displayed at the client device. The GUI can inform the user that potential malicious upload activity has been detected. The GUI can also include selectable GUI elements that allow the user to either ignore the potential malicious upload activity or terminate any current uploading activity associated with the malicious upload activity. In other instance, the anti-malware can automatically pause or terminate current uploading activity associated with the potential malicious upload activity.

As noted, a technical problem addressed by embodiments of the disclosure is the detection of malicious upload activity at a client device by malware, and in particular non-malware.

A technical solution to the above identified technical problem may include generating training data to train a machine learning model using information pertaining to characteristics of upload activity performed at one or more client devices, and implementing the trained machine learning model to predict whether upload activity at a client device is malicious or non-malicious upload activity where the trained machine learning model uses information pertaining to characteristics of upload activity performed at the client device as input the training a machine learning model.

Thus, the technical effect may include improving the training of a machine learning model used to predict malicious upload activity at a client device, and improving the accuracy of the prediction of the trained machine learning model as to whether upload activity at the client device is malicious or non-malicious upload activity.

FIG. 1 illustrates an example system architecture 100, in accordance with some embodiments of the disclosure. The system architecture 100 (also referred to as "system" herein) includes an anti-malware platform 120, one or more server machines 130 through 150, a data store 106, and client devices 110A-110Z connected to a network 104.

In embodiments, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some embodiments, data store 106 is a persistent storage that is capable of storing content items (such as datasets representative of characteristics of upload activity performed at one or more client devices) as well as data structures to tag, organize, and index the content items. Data store 106 may be hosted by one or more storage devices, such as main memory, magnetic or optical storage based disks, tapes or hard drives, NAS, SAN, and so forth. In some embodiments, data store 106 may be a network-attached file server, while in other embodiments data store 106 may be some other type of persistent storage such as an object-oriented database, a relational database, and so forth, that may be hosted by anti-malware platform 120 or one or more different machines coupled to the anti-malware platform 120 via the network 104.

The client devices 110A-110Z may each include a type of computing device such as a desktop personal computer (PCs), laptop computer, mobile phone, tablet computer, netbook computer, wearable device (e.g., smart watch, smart glasses, etc.) network-connected television, smart appliance (e.g., video doorbell), etc. In some embodiments, client devices 110A through 110Z may also be referred to as "user devices."

In some embodiments, one or more of the anti-malware platform 120 or server machines 130-150 may be or include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a client device 110A through 110Z with access to content items or to receive content items from client device 110A through 110Z. For example, the anti-malware platform 120 may distribute malicious upload activity engine 151 to client devices 110A through 110Z, send software updates or notifications to client devices 110A through 110Z, or receive information pertaining to characteristics of upload activity performed at client devices 110A through 110Z. The anti-malware platform 120 may also include a website (e.g., a webpage) or application back-end software that may be used to provide client devices 110A through 110Z with access to anti-malware information.

In some embodiments, a "user" may be represented as a single individual. However, other embodiments of the disclosure encompass a "user" being an entity controlled by a set of users and/or an automated source. For example, a set of individual users federated as one or more departments in organization may be considered a "user."

In some embodiments, anti-malware platform 120 is part of an organization, such as a corporate organization. In other embodiments, anti-malware platform 120 can be a third-party platform. In some embodiments, the third-party anti-malware platform 120 is accessible, at least in part, by one or more users of an organization. For example, a third-party can provide anti-malware services using the anti-malware platform 120 to one or more users of an organization. In embodiments, the user may access anti-malware platform 120 through a user account. The user may access (e.g., log in to) the user account by providing user account information (e.g., username and password) via an application (e.g., application 154) at client device 110Z. In some embodiments, anti-malware platform 120 includes malicious upload activity engine 151. In some embodiments, malicious upload activity engine 151 can perform aspects of the present disclosure.

Server machine 130 includes a training set generator 131 that is capable of generating training data (e.g., a set of training inputs and a set of target outputs) to train a machine learning model. Some operations of training set generator 131 are described in detail below with respect to FIG. 2-3.

Server machine 140 includes a training engine 141 that is capable of training a machine learning model 160 using the training data from training set generator 131. The machine learning model 160 may refer to the model artifact that is created by the training engine 141 using the training data that includes training inputs and corresponding target outputs (correct answers for respective training inputs). The training engine 141 may find patterns in the training data that map the training input to the target output (the answer to be predicted), and provide the machine learning model 160 that captures these patterns. The machine learning model 160 may be composed of, e.g., a single level of linear or non-linear operations (e.g., a support vector machine [SVM] or a deep (sequential) network, i.e., a machine learning model that is composed of multiple levels of non-linear operations). An example of a deep (sequential) network is a neural network with one or more hidden layers, and such machine learning model may be trained by, for example, adjusting weights of a neural network in accordance with a backpropagation learning algorithm or the like. For convenience, the remainder of this disclosure will refer to the implementation as a neural network, even though some implementations might employ an SVM or other type of learning machine instead of, or in addition to, a neural network.

In some embodiments, the training set is obtained from server machine 130. Server machine 150 includes a malicious upload activity engine 151 that provides current data (e.g., information pertaining to characteristics of upload activity performed at a client device where the client device is being monitored for malicious upload activity) as input to trained machine learning model 160 and runs the trained machine learning model 160 on the input to obtain one or more outputs. As described in detail below with respect to FIG. 4, in one embodiment malicious upload activity engine 151 is also capable of identifying amounts of data uploaded from a client device from the output of the trained machine learning model 160 and extract confidence data from the output that indicates a level of confidence that amounts of data corresponds to malicious upload activity or non-malicious upload activity.

In some embodiments, confidence data may include or indicate a level of confidence of that one or more amounts of data uploaded to one or more locations (e.g., for a category of applications, a particular application, or client device) correspond to malicious upload activity (or non-malicious upload activity). In one example, the level of confidence is a real number between 0 and 1 inclusive, where 0 indicates no confidence that one or more amounts of data uploaded to one or more locations correspond to malicious upload activity (e.g., absolute confidence that the amounts of data correspond to non-malicious upload activity) and 1 indicates absolute confidence that one or more amounts of data uploaded to one or more locations correspond to malicious upload activity (e.g., no confidence that the amounts of data correspond to non-malicious upload activity).

Also as noted above, for purpose of illustration, rather than limitation, aspects of the disclosure describe the training of a machine learning model and use of a trained machine learning model. In other embodiments, a heuristic model or rule-based model can be used as an alternative. It should be noted that in some other embodiments, one or more of the functions of server machines 130, 140, and 150 or anti-malware platform 120 may be provided by a fewer number of machines. For example, in some embodiments server machines 130 and 140 may be integrated into a single machine, while in some other embodiments one or more of server machines 130, 140, 150, or anti-malware platform 120 may be integrated into a single machine. In addition, in some embodiments one or more of server machines 130, 140, or 150 may be integrated into the anti-malware platform 120 or one or more of client device 110A-110Z.

In general, functions described in one embodiment as being performed by one or more of the anti-malware platform 120, server machine 130, server machine 140, or server machine 150 can also be performed at a client device, such as the client devices 110A through 110Z in other embodiments, if appropriate. For example, one or more of training set generator 131, training engine 141, or malicious upload activity engine 151 can be implemented at a client device, such as client device 110A through 110Z. In addition, the functionality attributed to a particular component can be performed by different or multiple components operating together. The anti-malware platform 120, server machine 130, server machine 140, or server machine 150 can also be accessed as a service provided to other systems or devices through appropriate application programming interfaces (API), and thus is not limited to use in websites.

Although embodiments of the disclosure are discussed in terms of anti-malware platforms, embodiments may also be generally applied to any type of platform or service.

In situations in which the systems discussed here collect personal information about users, or may make use of personal information, the users may be provided with an opportunity to control whether the anti-malware platform 120 collects user information (e.g., information about a user's upload activity and the data uploaded), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the anti-malware platform 120.

In some embodiments, a client device, such as client device 110Z, can implement malicious upload activity engine 151 at application 154 executed at client device 110Z. In some embodiments, application 154 can be a third-party application. In some embodiments, application 154 communicates with the operating system (OS) 152 (e.g., using API requests via an API) to obtain some or all the information pertaining to characteristics of upload activity performed at client device 110Z. In some embodiments, application 154 can communicate directly with applications executing at client device 110Z (e.g., using API requests via an API) to obtain some or all the information pertaining to characteristics of upload activity performed at client device 110Z. In some embodiments, malicious upload activity engine 151 can be implemented at the OS 152 of client device 110Z and communicate with the OS 152 (e.g., using system calls) to obtain some or all the information pertaining to characteristics of upload activity performed at client device 110Z.

In some embodiments, the trained machine learning model 160 can be implemented at a client device, such as client device 110Z to help detect malicious upload activity in real-time. Application 154 can provide notifications of malicious activity and perform other remedial actions such a pausing or terminating uploads associated with malicious upload activity. In some embodiments, the malicious upload activity engine 151 of application 154 of client device 110Z can include a trained machine learning model 160 used to detect malicious upload activity at client device 110Z.

In some embodiments, a user can log in to application 154 using login information such as user name and password. In some embodiments, two-factor authentication can be used at application 154 for secure log in. A user of client device 110Z can configure the application 154 with customized user settings that are stored as user preference data. For example, the user can pause monitoring for some period of time or disable notification for some period of time. In instance, if the user intends to create a backup copy of their client device, the user can disable notification from application 154 for some time period.

Figure 2:
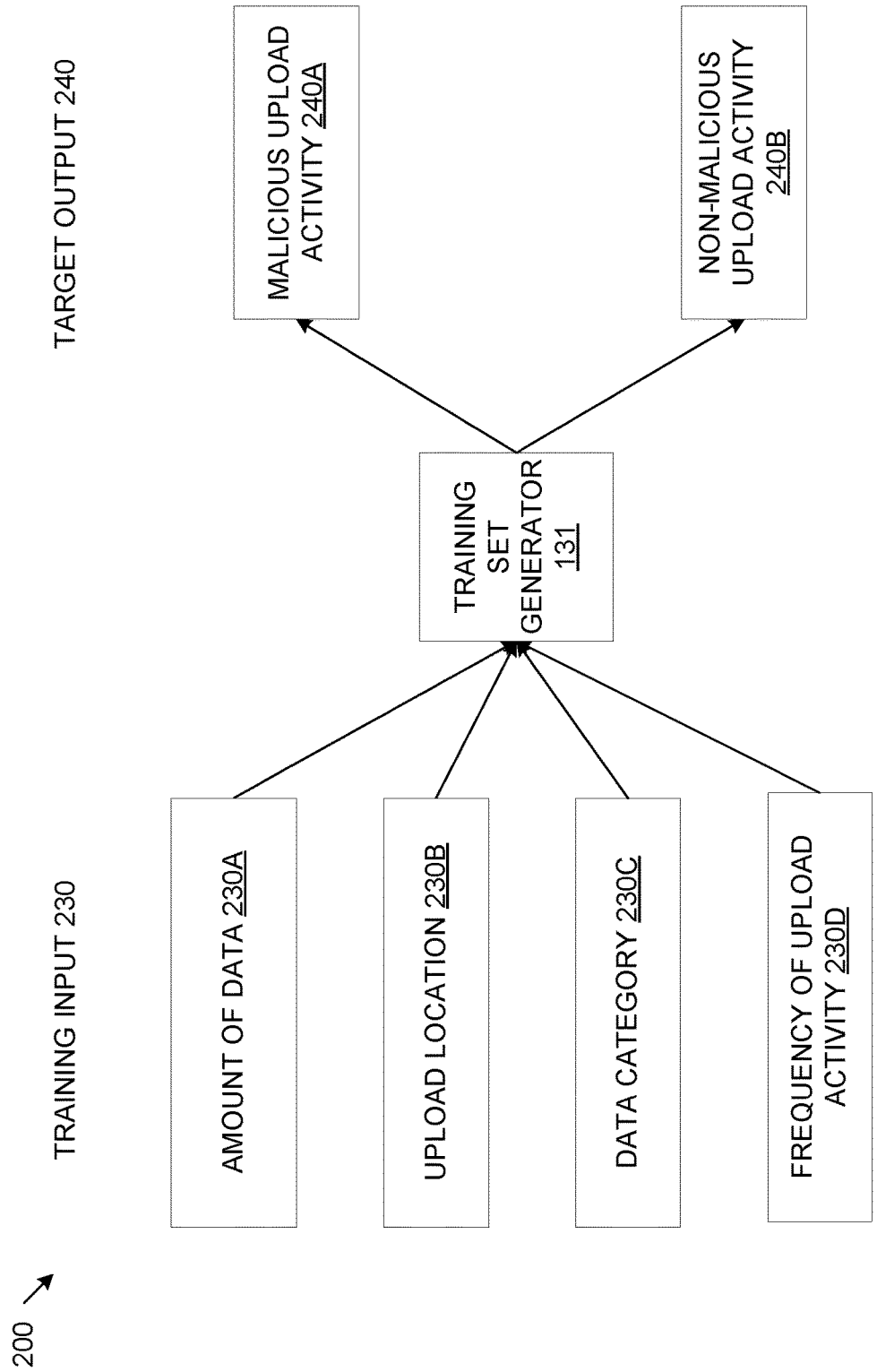
FIG. 2 is an example training set generator to create training data for a machine learning model using information pertaining to characteristics of upload activity performed at one or more client devices, in accordance with some embodiments of the disclosure.

FIG. 2 is an example training set generator to create training data for a machine learning model using information pertaining to characteristics of upload activity performed at one or more client devices, in accordance with some embodiments of the disclosure. System 200 shows training set generator 131, training inputs 230, and target outputs 240. System 200 may include similar components as system 100, as described with respect to FIG. 1. Components described with respect to system 100 of FIG. 1 may be used to help describe system 200 of FIG. 2.

In some embodiments, training set generator 131 generates training data that includes one or more training inputs 230, and one or more target outputs 240. The training data may also include mapping data that maps the training inputs 230 to the target outputs 240. Training inputs 230 may also be referred to as "features," "attributes," or "information." In some embodiments, training set generator 131 may provide the training data in a training set, and provide the training set to the training engine 141 where the training set is used to train the machine learning model 160. Generating a training set may further be described with respect to FIG. 3.

As noted above, application categories can refer to a grouping of one or more applications based on one or more features, such as the purpose of an application (e.g., a function or subject matter of an application). Examples of application categories include, but are not limited to, games, social networking, sports, productivity, books, business, education, entertainment, finance, sports, photos and videos, music, utilities, and so forth. In some embodiments, training inputs 230 may include one or more of amount of data 230A, upload location 230B, data category 230C, or frequency of upload activity 230D. Training output 240 can include one or more of malicious upload activity 240A or non-malicious upload activity 240B. Training input 230 and target output 240 can represent characteristics (e.g., features) of upload activity performed at one or more client devices.

In some embodiments, amount of data 230A can include the amount of data uploaded during a specified time interval (or range of time) for each of one or more application categories (or applications or client devices). The amount of data uploaded during a specified time period can be an average or absolute value. An example of amount of data 230A can include 40 megabytes (MB) (e.g., average value) of data uploaded each day for the sports application category of a particular client device. Another example of amount of data 230A can include 10 MB (e.g., average value) of data uploaded between 12PM-1PM per day for the social networking application category of a particular client device. In still another example, the amount of data 230A can include 30 MB (e.g., absolute value) of data uploaded Saturday, June $20^{th}$.

In some embodiments, amount of data 230A can include the amount of data uploaded during a specified time interval for each of one or more applications installed at a client device, or the amount of data uploaded during a specified time interval for the client device. An example of an amount of data 230A corresponding to an application (e.g., application level) can include 50 kilobytes (KB) of data uploaded every 12 hours by application X. An example of an amount of data 230A corresponding to a client device (e.g., client device level) can include 1.2 Gigabytes (GB) of data uploaded each day by client device Y.

In some embodiments, the amount of data 230A for a particular client device can be used as training input 230 multiple times but with different specified time intervals. For example, a first instance of amount of data 230A can include 40 megabytes (MB) of data uploaded each day for the news application category of a particular client device. Another instance of amount of data 230A can include 3KB of data uploaded during 1AM-2AM and 3MB of data uploaded during 10AM-11AM each day for the news application category of the particular client device.

In some embodiments, the time interval can include any interval of time, such as one or more a minute(s), hour(s), day(s), week(s), and so forth. In some embodiments, the time interval can be further be based on the local time with respect to the location of the particular client device. For example, the amount of data 230A for each hour local time can include the average amount of data uploaded between 1AM to 2AM local time, 2AM to 3AM local time and so forth.

In some embodiments, the amount of data uploaded for one or more ranges of time can be implemented as a training input 230. For example, an amount of data 230A of a range of time can be 100MB of data uploaded from 1 AM June $20^{th}$ to 1 AM June $21^{st}$.

In some embodiments, training input 230 can include upload location 230B. Upload location 230B can include information identifying one or more locations external to the client device to which a corresponding amount of data 230A is uploaded for each application category (or application or client device). In some embodiments, the information identifying locations external to the client device can include one or more of a resource locator (e.g., uniform resources locator (URL)), an external device identifier (e.g., name or numeric identifier of an external device), or a pathname of a file system external to the client device. In some embodiments, upload to a location external to the client device is performed using a wireless connection.

In some embodiments, training input 230 includes data category 230C. Data category 230C can include information identifying data categories corresponding to the amount of data 230A uploaded for the specified time interval for each of the application categories (or application or client device). A data category can be a grouping of data based on features (e.g., shared features) of the data, such as data formats, data types, or the purpose or use of the data. For example, an image data category can include any files having image formats, such as ".jpg," ".tiff," ".gif," etc. Examples of data categories can include image data, video data, audio data, video game data, location data (e.g., geographic information data), computer-aided design data, database data, desktop publishing data, text document data (e.g., storing formatted or plain text), financial records data, presentation data, web page data (e.g., browser data), among others. Other examples of data categories (e.g., corresponding to data types) can include integer data, character data, or string data.

In some embodiments, training input 230 can include a frequency of upload activity 230D. Frequency of upload activity 230D can include information identifying a frequency of upload activity that corresponds to the amount of data 230A. Frequency of upload activity 230D can be a measurement of upload(s) of a data unit from the client device to an external location over some time interval (e.g., where the time interval can be the same or different as the specified time interval associated with amount of data 230A). In some embodiments, a data unit can represent a file. In some embodiments, the data unit associated with frequency of upload activity 230D can include one or more files, such a zip file containing one or more files. In some embodiments, the data unit associated with frequency of upload activity 230D can include portions of the file. An example of frequency of upload activity 230D can include 8 files uploaded each day for a particular application category (or particular application or client device). Frequency can be an absolute value or average value.

In some embodiments, training input 230 is paired (or corresponds to) with target output 240. For example, an instance of training input 230 that includes one or more of amount of data 230A, upload location 230B, data category 230C, or frequency of upload activity 230D (e.g., features) is paired with a corresponding one of malicious upload activity 240A or non-malicious upload activity 240B of the target output 240.

For purposes of illustration, rather the limitation, the training input 230 and target output 240 can be used to train a "non-user-specific" machine learning model or a "user-specific" machine learning model. In some embodiments, training data corresponding to multiple client devices associated with multiple users can be used to train the "non-user-specific" machine learning model (e.g., non-user-specific trained machine learning model). In some embodiments, training data corresponding to one or more client devices associated with a specific user can be used to train a user-specific machine learning model (e.g., user-specific trained machine learning model. In some embodiments, a non-user-specific machine learning model can be retrained using training data corresponding to one or more client devices associated with a specific user to generate a user-specific machine learning model.

In some embodiments, the machine learning model can be trained using training data from multiple types of client device, multiple types of operating system, a particular type(s) of client device, a particular operating system(s), or a combination thereof. In some embodiments, the training data can include data for one or more types of client devices. For example, the training data can include information pertaining to characteristics of upload activity at mobile phones and tablet computers. In some embodiments, the training data can include data for a single type of client device. For example, the training data can include information pertaining to characteristics of upload activity performed at only mobile phones. In some embodiments, the training data can include data only for a specific operating system type.

For the sake of illustration and brevity, rather than limitation, training data, and in particular training input 230 and target output 240 are described as pertaining to one or more application categories (e.g., application category level training data). It can be further understood that in some embodiments, the training data can pertain to one or more of particular application(s) (e.g., application level training data) or particular client device(s) (e.g., client device level training data) in a same or similar manner as an application category. For example, another instance of the amount of data 230A can include the amount of data uploaded during a specified time interval for one or more applications. In another example, another instance amount of data 230A can include the amount of data uploaded during a specified time interval for a particular client device. For the sake of brevity, rather than limitation, a description of training data for particular application or particular device is not necessarily explicitly recited for each of the training input 230 or target output 240. However, it should be understood that in some embodiments the training data for particular applications or particular client can be generated and used in a similar manner as the training data for one or more application categories.

Figure 3:
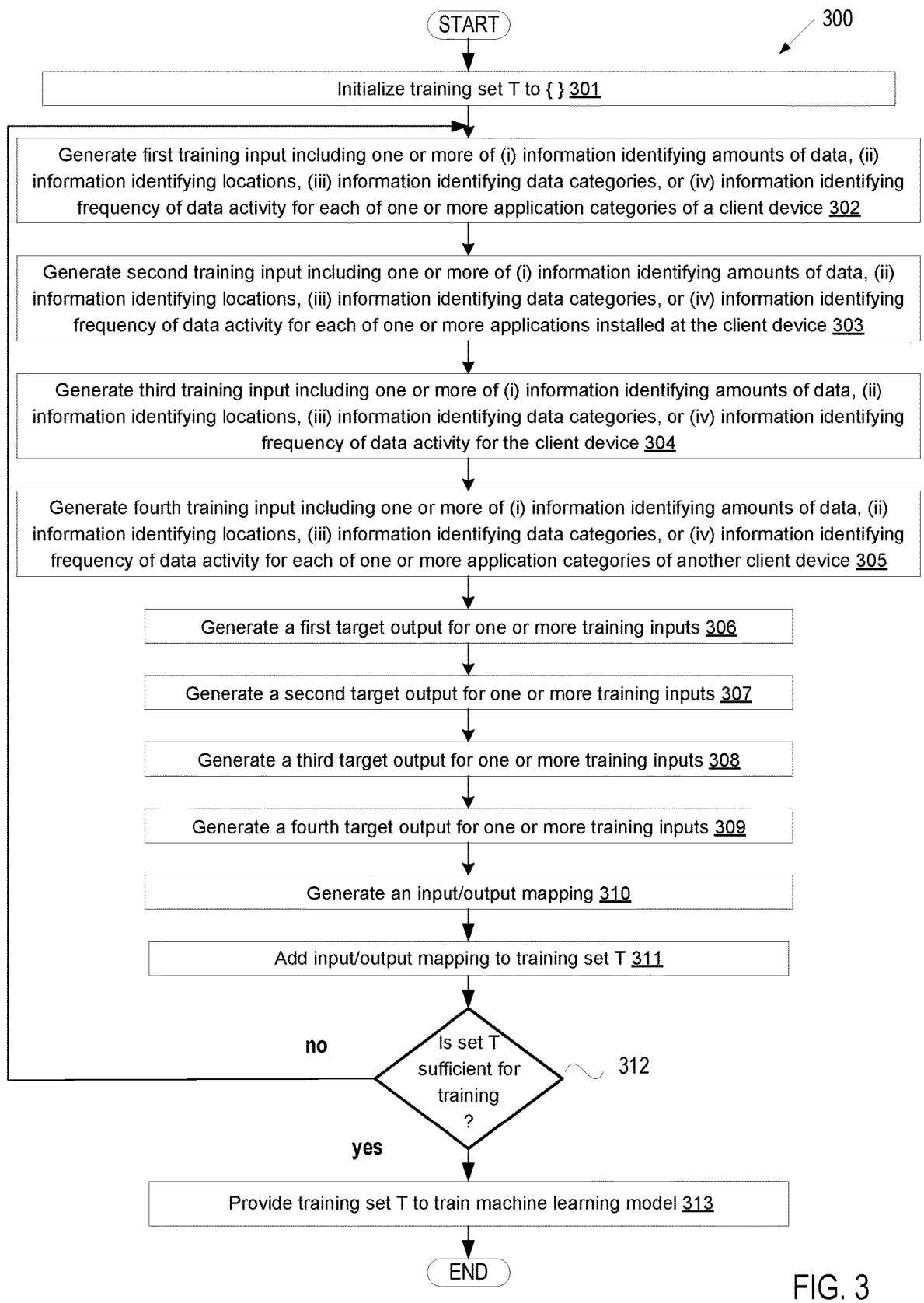
FIG. 3 depicts a flow diagram of one example of a method for training a machine learning model, in accordance with some embodiments of the disclosure.

FIG. 3 depicts a flow diagram of one example of a method for training a machine learning model, in accordance with some embodiments of the disclosure. The method is performed by processing logic that may include hardware (circuitry, dedicated logic, etc.), software (e.g., instructions run on a processing device), or a combination thereof. In some embodiments, some or all the operations of method 300 may be performed by one or more components of system 100 of FIG. 1. In some embodiments, one or more operations of method 300 may be performed by training set generator 131 of server machine 130 as described with respect to FIG. 1. In some embodiments, one or more operations of method 300 may be performed by training set generator 131 executing at client device 110Z. It may be noted that components described with respect FIG. 1 may be used to illustrate aspects of FIG. 3. In some embodiments, the operations (e.g., blocks 301-313) can be the same, different, fewer, or greater.

Method 300 generates training data for a machine learning model. In some embodiments, at block 301 processing logic implementing method 300 initializes a training set T to an empty set.

At block 302, processing logic generates first training input that includes one or more of (i) information identifying amounts of data, (ii) information identifying locations, (iii) information identifying data categories, or (iv) information identifying frequency of data activity for each of one or more application categories of a client device.

In some embodiments, the first training input includes (i) information identifying first amounts of data uploaded during a specified time interval for one or more of multiple application categories, and (ii) information identifying first locations external to a client device to which the first amounts of data are uploaded. Each of the one or more application categories include one or more applications that are installed at the client device and that upload the first amounts of data.

In some embodiments, the first training input includes (iii) information identifying data categories corresponding to the first amounts of data uploaded during the specified time interval for each of the one or more application categories.

In some embodiments, the first training input includes (iv) information identifying a frequency of upload activity that corresponds to uploading the first amounts of data during the specified time interval for each of the one or more application categories.

At block 303, processing logic generates second training input including one or more of (i) information identifying amounts of data, (ii) information identifying locations, (iii) information identifying data categories, or (iv) information identifying frequency of data activity for each of one or more applications installed at the client device.

In some embodiments, the specified time interval is a first specified time interval. The second training input includes (i) information identifying second amounts of data uploaded during a second specified time interval for each of the one or more of a plurality of applications, and (ii) information identifying second locations external to the client device to which the second amounts of data are uploaded. Each of the one or more applications are installed at the client device and upload the second amounts of data. In some embodiments, the first specified time period and the second specified time period are the same or different time periods.

At block 304, processing logic generates third training input that includes one or more of (i) information identifying amounts of data, (ii) information identifying locations, (iii) information identifying data categories, or (iv) information identifying frequency of data activity for the client device.

In some embodiments, the third training input includes (i) information identifying third amounts of data uploaded by the client device during a third specified time interval, and (ii) information identifying third locations external to the client device to which the third amounts of data are uploaded. In some embodiments, the first specified time interval and the third specified time interval can be the same or different time intervals.

At block 305, processing logic generates fourth training input including one or more of (i) information identifying amounts of data, (ii) information identifying locations, (iii) information identifying data categories, or (iv) information identifying frequency of data activity for each of one or more application categories of another client device.

In some embodiments, the client device is a first client device, The fourth training input includes (i) information identifying fourth amounts of data uploaded during a fourth specified time interval for each of the one or more application categories, and (ii) information identifying fourth locations external to a second client device to which the fourth amounts of data are uploaded. In some embodiments, the first specified time interval and the fourth specified time interval can be the same or different time intervals. In some embodiments, the first client device and the second client device are associated with different users. In some embodiments, the first client device and the second client device are a same type of client device. In some embodiments, types of client devices include mobile phones, laptop computers, desktop computers, tablet computers, or wearable devices.

At block 306, processing logic generates a first target output for one or more of the training inputs (e.g., the first training input). In some embodiments, the first target output indicates whether the first amounts of data uploaded to the first locations correspond to malicious or non-malicious upload activity. In some embodiments, the first target output indicates whether the data categories corresponding to the first amounts of data correspond to the malicious or non-malicious upload activity. In some embodiments, the first target output indicates whether the frequency of upload activity that corresponds to uploading the first amounts of data correspond to malicious or non-malicious upload activity.

At block 307, processing logic generates a second target output for one or more training inputs (e.g., the second training input). In some embodiments, the second target output indicates whether the second amounts of data uploaded to the second locations by each of one or more applications correspond to the malicious or the non-malicious upload activity.

At block 308, processing logic generates a third target output for one or more training inputs (e.g., third training input). In some embodiments, the third target output indicates whether the third amounts of data uploaded by the client device to the third locations correspond to the malicious or the non-malicious upload activity.

At block 309, processing logic generates a fourth target output for one or more training inputs (e.g., fourth training input). In some embodiments, the fourth target output indicates whether the fourth amounts of data uploaded by a second client device to the fourth locations correspond to the malicious or the non-malicious upload activity.

At block 310, processing logic optionally generates mapping data that is indicative of an input/output mapping. The input/output mapping (or mapping data) may refer to the training input (e.g., one or more of the training inputs described herein), the set of target outputs for the training input (e.g., one or more of the target outputs described herein), and an association between the training input(s) and the target output(s).

At block 311, processing logic adds the mapping data generated at block 310 to training set T.

At block 312, processing logic branches based on whether training set T is sufficient for training machine learning model 160. If so, execution proceeds to block 313, otherwise, execution continues back at block 302. It should be noted that in some embodiments, the sufficiency of training set T may be determined based simply on the number of input/output mappings in the training set, while in some other embodiments, the sufficiency of training set T may be determined based on one or more other criteria (e.g., a measure of diversity of the training examples, accuracy exceeding a threshold, etc.) in addition to, or instead of, the number of input/output mappings.

At block 313, processing logic provides training set T to train machine learning model 160. In one embodiment, training set T is provided to training engine 141 of server machine 140 to perform the training. In the case of a neural network, for example, input values of a given input/output mapping (e.g., numerical values associated with training inputs 230) are input to the neural network, and output values (e.g., numerical values associated with target outputs 240) of the input/output mapping are stored in the output nodes of the neural network. The connection weights in the neural network are then adjusted in accordance with a learning algorithm (e.g., back propagation, etc.), and the procedure is repeated for the other input/output mappings in training set T. After block 313, machine learning model 160 can be trained using training engine 141 of server machine 140. The trained machine learning model 160 may be implemented by malicious upload activity engine 151 (of server machine 150 or anti-malware platform 120 or client device 110Z) to determine whether any upload activity of a client device is malicious or non-malicious upload activity.

In some embodiments, the training set T can include information pertaining to characteristics of upload activity performed at multiple client devices associated with various users. In some embodiments, processing logic generates a first trained machine learning model based on the training data (e.g., training set T). The training data includes information pertaining to characteristics of upload activity performed at multiple client devices associated multiple users.

In some embodiments, the trained machine learning model can be retained using one or more of the operations described above. In some embodiments, the first trained machine learning model can be retrained using user-specific information pertaining to user-specific characteristics of upload activity performed at another client device. In some embodiments, the user-specific characteristic of upload activity can be from a different user than users associated with the first trained machine learning model. In some embodiments, user-specific training data is generated to re-train the first trained machine learning model to create a user-specific trained machine learning model. Processing logic can generate fifth training input. The fifth training input includes (i) information identifying fifth amounts of user-specific data uploaded during a fifth specified time interval for each of the one or more application categories, and (ii) information identifying fifth locations external to the third client device (e.g., the client device of the particular user for which the machine learning model is being retrained) to which the fifth amounts of data are uploaded. Processing logic can generate a fifth target output for the fifth training input. The fifth target output indicates whether the fifth amounts of data uploaded to the fifth locations correspond to the malicious or the non-malicious upload activity. Processing logic can provide the user-specific training data to retrain the first trained machine learning model on (i) a new set of training inputs including the fifth training input, and (ii) a new set of target outputs including the fifth target output.

Figure 4:
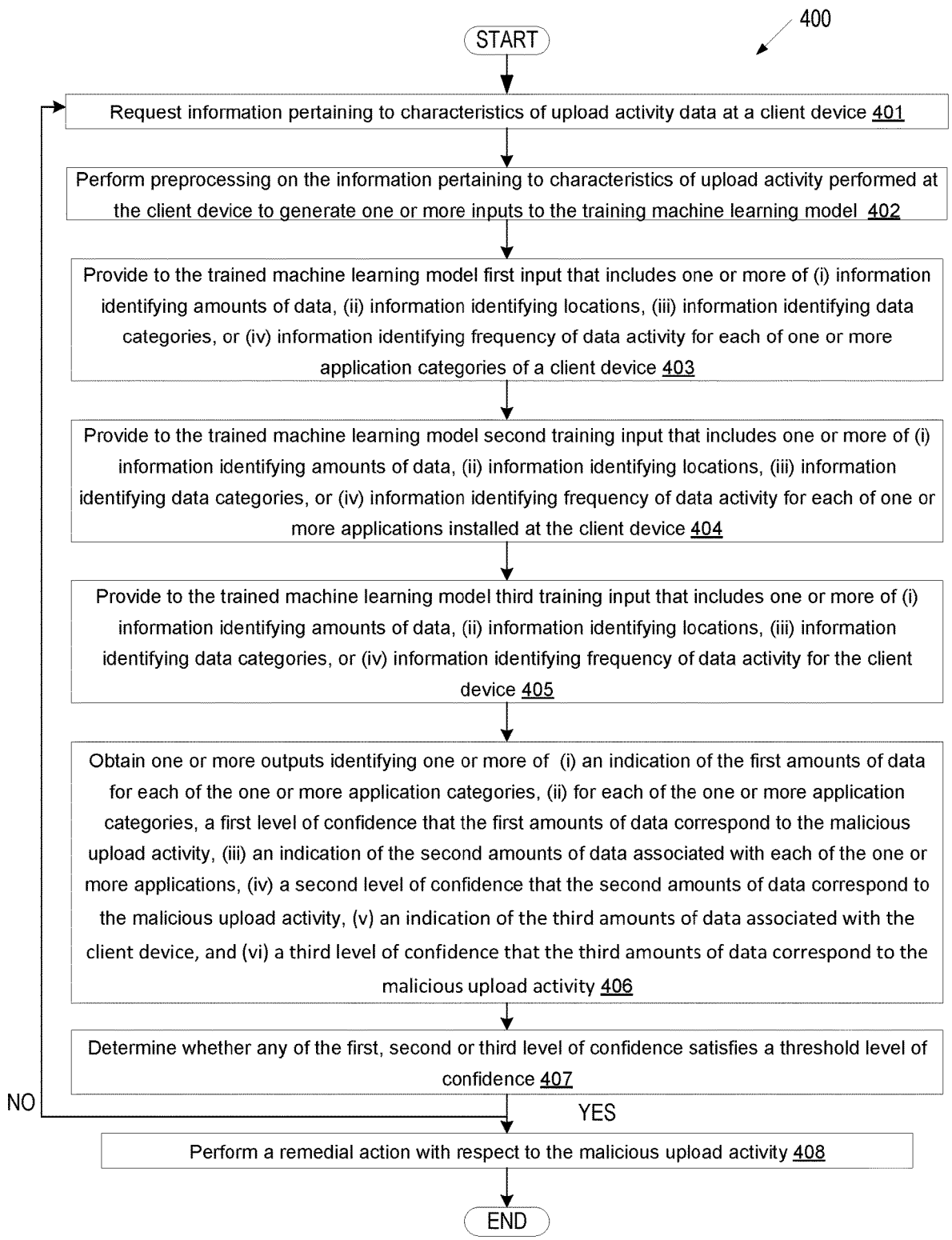
FIG. 4 depicts a flow diagram of one example of a method for using the trained machine learning model to detect malicious upload activity at a client device, in accordance with some embodiments of the disclosure.

FIG. 4 depicts a flow diagram of one example of a method for using the trained machine learning model to detect malicious upload activity at a client device, in accordance with some embodiments of the disclosure. The method is performed by processing logic that may include hardware (circuitry, dedicated logic, etc.), software (e.g., instructions run on a processing device), or a combination thereof. In some embodiments, some or all of the operation of method 400 may be performed by malicious upload activity engine 151 of a client device, such as client device 110Z, implementing a trained machine learning model, such as trained machine learning model 160 as described with respect to FIGS. 1-3. In some embodiments, some or all the operations of method 400 may be performed by one or more components of system 100 of FIG. 1. In some embodiments, one or more operations of method 400 may be performed by malicious upload activity engine 151 of server machine 150 or malicious upload activity engine 151 of anti-malware platform 120 implementing a trained machine learning model, such as trained machine learning model 160 as described with respect to FIGS. 1-3. It may be noted training data described with respect to FIG. 2-3 can help describe input and output data of the trained machine learning model as described with FIG. 4, unless otherwise described.

Method 400 may begin at block 401 where processing logic implementing method 400 requests information pertaining to characteristics of upload activity data at a client device. In some embodiments, processing logic can use API requests (e.g., periodic API requests) to request the OS of the client device for information pertaining to characteristics of upload activity performed at the client device. In some embodiments, the processing logic can use API requests to request one or more applications installed at the client device for information pertaining to characteristics of upload activity performed at the client device.

At block 402, processing logic performs preprocessing of the information pertaining to characteristics of upload activity performed at the client device to generate one or more inputs to the trained machine learning model.

In some embodiments, to perform preprocessing processing logic can determine the application categories that are associated with the data uploads during a particular time interval. In some embodiments, in determining an application category to which an application pertains, the processing logic can query the OS or application for the particular application category. In other embodiments, processing logic can retrieve from the OS or application information identifying a particular application associated with a data upload. The identifiers can include, but are not limited to, the application name or other identifier associated with the application. A record can be stored at the client device or at a location external to the client device that maps an application identifier to a particular application category. A record can be a data structure that includes one or more entries, where each entry maps an application identifier to a particular application category. Processing logic can query the record using the application identifier and receive the corresponding application category for the application.

In some embodiments, processing logic can determine total amounts of data for some time interval for one or more of an application category, application, or the client device. Processing logic can determine a total amount of data for some time interval using timestamps associated with the uploaded data and by aggregating the amount of data uploaded for some time interval based on the timestamps. In some embodiments, the amount of data is an absolute value of the data uploaded for one or more an application category, application, or the client device. It can be noted that the time interval used with the trained machine learning model can be the same or different time interval used to train the machine learning model.

In some embodiments, processing logic can accumulate and store information pertaining to characteristics of upload activity for a time interval, but provide training input to the training machine learning model at an aggregate basis at sub-intervals. For example, if the time interval for training the machine learning model is per day (e.g., amount of data uploaded to a location by an application per day), processing logic may use the amount of data uploaded by the application for the $1^{st}$ hour of a day as input to the trained machine learning model. After the $2^{nd}$ hour of the day, processing logic may use the total amount of data for the $1^{st}$ hour and the $2^{nd}$ hour of the day as input to trained machine learning model. After the $3^{rd}$ hour of the day, processing logic may use the total amount of data for the $1^{st}$, $2^{nd}$, and $3^{rd}$ hour of the day as input to the trained machine learning model, and so forth.

At block 403, processing logic provides to the trained machine learning model first input that includes one or more of (i) information identifying amounts of data, (ii) information identifying locations, (iii) information identifying data categories, or (iv) information identifying frequency of data activity for each of one or more application categories of a client device.

In some embodiments, processing logic provides to the trained machine learning model first input including (i) information identifying first amounts of data uploaded during a specified time interval for one or more application categories, and (ii) information identifying first locations external to the client device to which the first amounts of data are uploaded. Each of the application categories include one or more applications that are installed at the client device and that upload the first amounts of data.

In some embodiments, first input includes (iii) information identifying data categories corresponding to the first amounts of data uploaded during the specified time interval for each of the one or more application categories.

In some embodiments, first input further includes (iv) information identifying a frequency of upload activity that corresponds to uploading the first amounts of data during the specified time interval for each of the one or more application categories.

At block 404, processing logic provides to the trained machine learning model second training input that includes one or more of (i) information identifying amounts of data, (ii) information identifying locations, (iii) information identifying data categories, or (iv) information identifying frequency of data activity for each of one or more applications installed at the client device.

In some embodiments, processing logic provides to the trained machine learning model second input including (i) information identifying second amounts of data uploaded during a second specified time interval for one or more applications, and (ii) information identifying second locations external to the client device to which the second amounts of data are uploaded. Each of the one or more applications are installed at the client device and upload the second amounts of data.

At block 405, processing logic provides to the trained machine learning model third training input that includes one or more of (i) information identifying amounts of data, (ii) information identifying locations, (iii) information identifying data categories, or (iv) information identifying frequency of data activity for the client device.

In some embodiments, processing logic provides to the trained machine learning model third input including (i) information identifying third amounts of data uploaded by the client device during a third specified time interval, and (ii) information identifying third locations external to the client device to which the third amounts of data are uploaded.

At block 406, processing logic obtain one or more outputs identifying one or more of (i) an indication of the first amounts of data for each of the one or more application categories, (ii) for each of the one or more application categories, a first level of confidence that the first amounts of data correspond to the malicious upload activity, (iii) an indication of the second amounts of data associated with each of the one or more applications, (iv) a second level of confidence that the second amounts of data correspond to the malicious upload activity, (v) an indication of the third amounts of data associated with the client device, and (vi) a third level of confidence that the third amounts of data correspond to the malicious upload activity.

In some embodiments, processing logic obtains, from the trained machine learning model, one or more outputs identifying (i) an indication of the first amounts of data uploaded to the first locations for each of the one or more application categories, and (ii) for each of the one or more application categories, a level of confidence that the first amounts of data uploaded to the first locations correspond to a malicious upload activity.

In some embodiments, the one or more outputs further identify (iii) an indication of the second amounts of data uploaded to the second locations for each of the one or more applications, and (iv) a second level of confidence that the second amounts of data correspond to the malicious upload activity.

In some embodiments, the one or more outputs further identify (v) an indication of the third amounts of data uploaded to the third locations by the client device, and (vi) a third level of confidence that the third amounts of data correspond to the malicious upload activity.

At block 407, processing logic determines whether any of the first, second or third level of confidence satisfies (e.g., meets or exceeds) a threshold level of confidence. In some embodiments, the same threshold level of confidence can be used for all of the first, second, or third levels of confidence. Responsive to determining that any of the first, second or third levels of confidence satisfies (e.g., meets or exceeds) a threshold level of confidence, processing logic proceeds to block 408. Responsive to determining that any of the first, second or third levels of confidence does not satisfy (e.g., meets or exceeds) a threshold level of confidence, processing logic proceeds to block 401.

In some embodiments, one or more of the first, second, or third levels of confidence are compared to a threshold level of confidence that is different from a threshold level of confidence used with the remaining one(s) of the first, second, or third levels of confidence. In some embodiments, processing logic can determine whether a specified combination of the first, second, or third level of confidence (e.g., any two of the first, second, or third levels of confidence) satisfy a threshold level of confidence to determine whether to proceed to block 408. In an example, processing logic can determine whether any two of the first, second, or third levels of confidence satisfy a threshold level of confidence or if a particular one (e.g., second level of confidence) satisfies the threshold level of confidence to determine whether to proceed to block 408.

In some embodiments, processing logic determines, for any of the application categories (or applications or client device), whether the level of confidence satisfies a threshold level of confidence.

In some embodiments, multiple threshold levels of confidence can be implemented. For example, multiple threshold levels of confidence can be implemented such that the remedial action performed at block 408 is tiered so that satisfying a higher threshold level of confidence and lower threshold level of confidence causes a more restrictive or severe remedial action than satisfying only a lower threshold level of confidence.

In some embodiments, the threshold level of confidence is a first threshold level of confidence. Processing logic determines, for any of the application categories, whether the level of confidence satisfies a second threshold level of confidence. Responsive to determining that the level of confidence for the particular application category satisfies the first threshold level of confidence and does not satisfy the second threshold level of confidence, processing logic performs the first remedial action with respect to the malicious upload activity (less restrictive remedial action). For example, processing logic sends a notification via the client device that client device indicating the current upload activity is potentially malicious upload activity. Responsive to determining that the level of confidence for the particular application category satisfies the first threshold level of confidence and the second threshold level of confidence, processing logic performs a second remedial action with respect to the malicious upload activity (more restrictive remedial action). For example, processing logic terminates the malicious upload activity.

At block 408, processing logic perform a remedial action with respect to the malicious upload activity. In some embodiments, responsive to determining that the level of confidence for a particular application category (or application or client device) satisfies the threshold level of confidence, processing logic performs a first remedial action with respect to the malicious upload activity associated with the particular application category.

In some embodiments, a remedial action can include providing a user notification identifying the malicious upload activity. For example, an email or text message can be sent to the client device informing the user of the detected malicious upload activity. The notification can provide additional information about the malicious upload activity including, but not limited to, the time of the detected malicious upload activity, the application category, application, or client device associated with malicious upload activity, the amount of data maliciously uploaded, or any other information pertaining to the malicious upload activity. In some embodiments, the notification can include a graphical user interface (GUI) that is invoked to display notification information at the client device. In some embodiments, remedial action can include notifying the user of the potentially malicious upload activity but allowing the malicious upload activity to continue until the user takes some action. For example, the GUI can include selectable GUI features. The selection of a first GUI feature allows the upload activity to continue and a selection of a second GUI feature pauses or terminates the upload activity.

In some embodiments, the remedial action includes pausing the malicious upload activity at the client device for a time period (e.g., with or without the user's input after determining the malicious upload activity).

In some embodiments, the remedial action includes terminating the malicious upload activity at the client device (e.g., with or without the user's input after determining the malicious upload activity). In some embodiments, a combination of one or more remedial actions can be performed. In some embodiments, the one or more remedial actions can be performed in accordance with user preference data. For example, a user can select a preferred remedial action which is stored as user preference data. The preferred remedial action can be performed if the level of confidence satisfies a threshold level of confidence in accordance with the user preference data. In some embodiments, the threshold level of confidence can be configured or changed by the user or administrator and stored as user preference data. In some embodiments, prior to performing a remedial action, processing logic can determine whether any user preference data indicates that a particular remedial action is to be or not to be performed. Responsive to determining that a particular remedial action is not to be performed based on the user preference data, processing logic does not perform the particular remedial action identified in the user preference data. For example, processing logic can determine that some upload activity qualifies as malicious upload activity. Processing logic can determine that user preference data indicates that the user has paused notifications of malicious upload activity for the current time period. Responsive to the determination, processing logic does not send a notification of malicious upload activity to be displayed at the client device. Responsive to determining that a particular remedial action is to be performed based on the user preference data, processing logic performs the remedial action identified in the user preference data.

Figure 5:
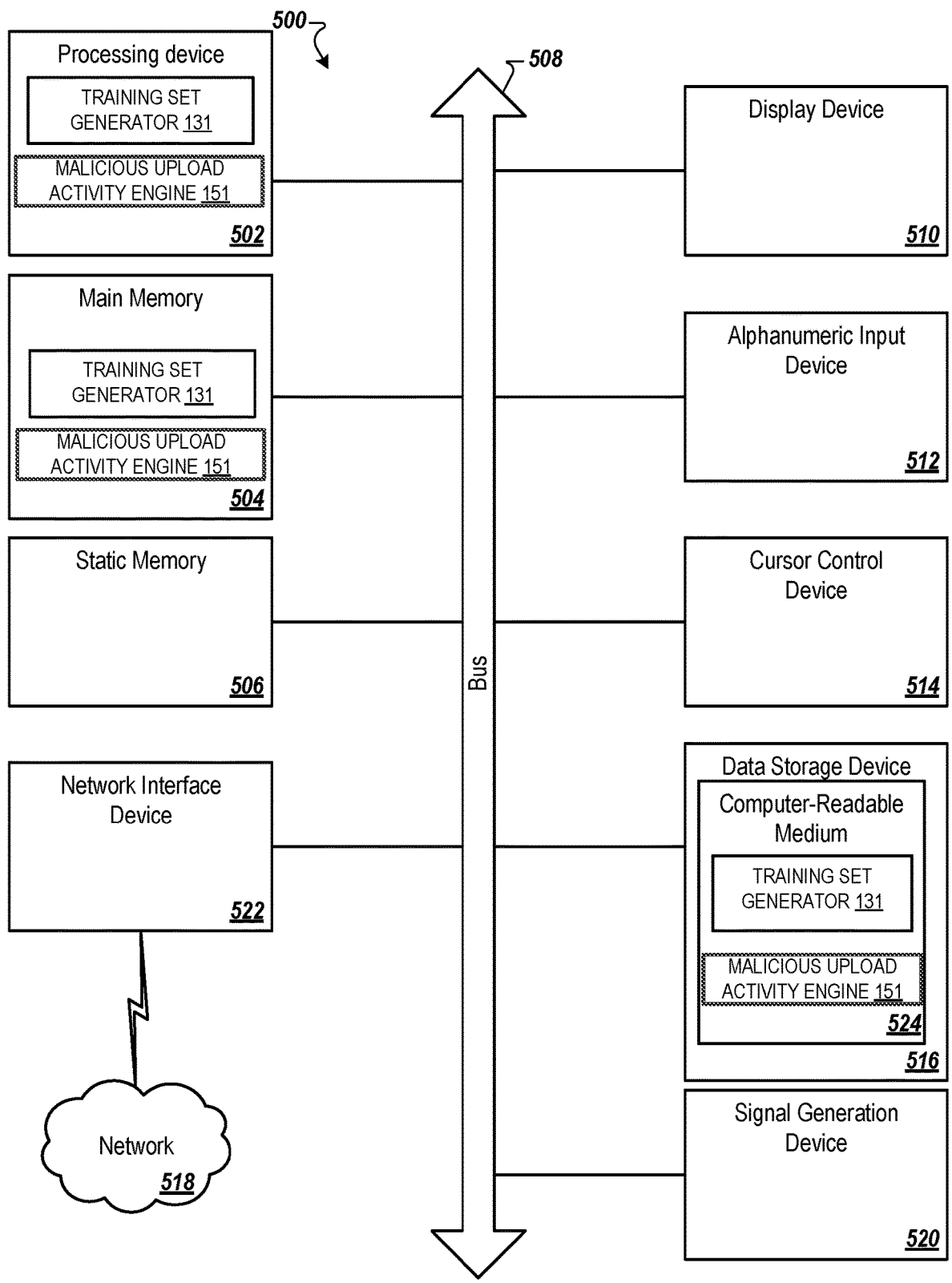
FIG. 5 is a block diagram illustrating an exemplary computer system, in accordance with some embodiments of the disclosure.

FIG. 5 is a block diagram illustrating an exemplary computer system 500, in accordance with an embodiment of the disclosure. The computer system 500 executes one or more sets of instructions that cause the machine to perform any one or more of the methodologies discussed herein. Set of instructions, instructions, and the like may refer to instructions that, when executed computer system 500, cause computer system 500 to perform one or more operations of training set generator 131 or malicious upload activity engine 151. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the system architecture 100 and the training set generator 131 or malicious upload activity engine 151 for performing the operations discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 on which is stored the sets of instructions of the system architecture 100 and of training set generator 131 or of malicious upload activity engine 151 embodying any one or more of the methodologies or functions described herein. The sets of instructions of the system architecture 100 and of training set generator 131 or of malicious upload activity engine 151 may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating", "providing", "obtaining", "identifying", "determining", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method for training a machine learning model using information pertaining to characteristics of upload activity performed at a client device, the method comprising:
   generating training data to train the machine learning model, wherein generating the training data comprises:
      generating first training input, the first training input comprising (i) information identifying first amounts of data uploaded from the client device during a specified time interval and for each of a plurality of application categories, and (ii) information identifying first locations external to the client device to which the first amounts of data are uploaded, wherein each of the plurality of application categories comprise one or more applications that are installed at the client device and that upload the first amounts of data; and
      generating a first target output for the first training input, wherein the first target output indicates whether the first amounts of data uploaded to the first locations correspond to malicious or non-malicious upload activity; and
   providing the training data to train the machine learning model on (i) a set of training inputs comprising the first training input, and (ii) a set of target outputs comprising the first target output.

2. The method of claim 1,
   wherein the first training input further comprises (iii) information identifying data categories corresponding to the first amounts of data uploaded during the specified time interval for each of the plurality of application categories; and
   wherein the first target output further indicates whether the data categories corresponding to the first amounts of data correspond to the malicious or the non-malicious upload activity.

3. The method of claim 2,
   wherein the first training input further comprises (iv) information identifying a frequency of upload activity that corresponds to uploading the first amounts of data during the specified time interval for each of the plurality of application categories; and wherein the first target output further indicates whether the frequency of upload activity that corresponds to uploading the first amounts of data correspond to the malicious or the non-malicious upload activity.

4. The method of claim 1, wherein the specified time interval is a first specified time interval, wherein generating the training data further comprises:
  generating second training input, the second training input comprising (i) information identifying second amounts of data uploaded during a second specified time interval for each of the one or more of a plurality of applications, and (ii) information identifying second locations external to the client device to which the second amounts of data are uploaded, wherein each of the one or more applications are installed at the client device and upload the second amounts of data; and
  generating a second target output for the second training input, wherein the second target output indicates whether the second amounts of data uploaded to the second locations correspond to the malicious or the non-malicious upload activity; and
  wherein (i) the set of training inputs comprises the second training input, and (ii) the set of target outputs comprises the second target output.

5. The method of claim 1, wherein generating the training data further comprises:
  generating third training input, the third training input comprising (i) information identifying third amounts of data uploaded by the client device during a third specified time interval, and (ii) information identifying third locations external to the client device to which the third amounts of data are uploaded; and
  generating a third target output for the third training input, wherein the third target output indicates whether the third amounts of data uploaded by the client device to the third locations correspond to the malicious or the non-malicious upload activity; and
  wherein (i) the set of training inputs comprises the third training input, and (ii) the set of target outputs comprises the third target output.

6. The method of claim 1, wherein the client device is a first client device, wherein generating the training data comprises:
  generating fourth training input, the fourth training input comprising (i) information identifying fourth amounts of data uploaded during a fourth specified time interval for the plurality of application categories, and (ii) information identifying fourth locations external to a second client device to which the fourth amounts of data are uploaded; and
  generating a fourth target output for the fourth training input, wherein the fourth target output indicates whether the fourth amounts of data uploaded to the fourth locations correspond to the malicious or the non-malicious upload activity; and
  wherein (i) the set of training inputs comprises the fourth training input, and (ii) the set of target outputs comprises the fourth target output.

7. The method of claim 6, wherein the first client device and the second client device are associated with different users, wherein the first client device and the second client device are a same type of client device, wherein types of devices comprise a mobile phone, a laptop computer, a desktop computer, a tablet computer, or wearable device.

8. The method of claim 7, wherein the training data is first training data, the method further comprising:
  generating a first trained machine learning model based on the first training data, wherein the first training data comprises information pertaining to characteristics of upload activity performed at a plurality of client devices associated with a plurality of users;
  retraining the first trained machine learning model using user-specific information pertaining to user-specific characteristics of upload activity performed at a third client device, the method comprising:
  generating second training data to retrain the first trained machine learning model to create a user-specific trained machine learning model, wherein generating the second training data comprises:
  generating fifth training input, the fifth training input comprising (i) information identifying fifth amounts of data uploaded during a fifth specified time interval for the plurality of application categories, and (ii) information identifying fifth locations external to the third client device to which the fifth amounts of data are uploaded; and
  generating a fifth target output for the fifth training input, wherein the fifth target output indicates whether the fifth amounts of data uploaded to the fifth locations correspond to the malicious or the non-malicious upload activity; and
  providing the second training data to retrain the first trained machine learning model on (i) a new set of training inputs comprising the fifth training input, and (ii) a new set of target outputs comprising the fifth target output.

9. The method of claim 1, wherein each training input of the set of training inputs is mapped to the first target output in the set of target outputs.

10. A method for using a trained machine learning model with respect to information pertaining to characteristics of upload activity performed at a client device, the method comprising:
  providing to the trained machine learning model first input comprising (i) information identifying first amounts of data uploaded from the client device during a specified time interval and for each of a plurality of application categories, and (ii) information identifying first locations external to the client device to which the first amounts of data are uploaded, wherein each of the plurality of application categories comprise one or more applications that are installed at the client device and that upload the first amounts of data; and
  obtaining, from the trained machine learning model, one or more outputs identifying (i) an indication of the first amounts of data uploaded to the first locations for each of the plurality of application categories, and (ii) for each of the plurality of application categories, a level of confidence that the first amounts of data uploaded to the first locations correspond to a malicious upload activity.

11. The method of claim 10, wherein the first input further comprising (iii) information identifying data categories corresponding to the first amounts of data uploaded during the specified time interval for each of the plurality of application categories.

12. The method of claim 11, wherein the first input further comprising (iv) information identifying a frequency of upload activity that corresponds to uploading the first amounts of data during the specified time interval for each of the plurality of application categories.

13. The method of claim 10, further comprising:
determining, for any of the plurality of application categories, whether the level of confidence satisfies a threshold level of confidence; and
responsive to determining that the level of confidence for a particular application category satisfies the threshold level of confidence, performing a first remedial action with respect to the malicious upload activity associated with the particular application category.

14. The method of claim 13, wherein performing the first remedial action with respect to the malicious upload activity comprises one or more of:
providing a user notification identifying the malicious upload activity;
pausing the malicious upload activity from the client device for a time period; or
terminating the malicious upload activity from the client device.

15. The method of claim 13, wherein the threshold level of confidence is a first threshold level of confidence, the method further comprising:
determining, for any of the plurality of application categories, whether the level of confidence satisfies a second threshold level of confidence;
responsive to determining that the level of confidence for the particular application category satisfies the first threshold level of confidence and does not satisfy the second threshold level of confidence, performing the first remedial action with respect to the malicious upload activity; and
responsive to determining that the level of confidence for the particular application category satisfies the first threshold level of confidence and the second threshold level of confidence, performing a second remedial action with respect to the malicious upload activity.

16. The method of claim 10, wherein the specified time interval is a first specified time interval, wherein the level of confidence is a first level of confidence, the method further comprising:
providing to the trained machine learning model second input comprising (i) information identifying second amounts of data uploaded during a second specified time interval for one or more of a plurality of applications, and (ii) information identifying second locations external to the client device to which the second amounts of data are uploaded, wherein each of the one or more applications are installed at the client device and upload the second amounts of data; and
wherein the one or more outputs further identifying (iii) an indication of the second amounts of data uploaded to the second locations for each of the one or more applications, and (iv) a second level of confidence that the second amounts of data correspond to the malicious upload activity.

17. The method of claim 16, further comprising:
providing to the trained machine learning model third input comprising (i) information identifying third amounts of data uploaded by the client device during a third specified time interval, and (ii) information identifying third locations external to the client device to which the third amounts of data are uploaded; and
wherein the one or more outputs further identifying (v) an indication of the third amounts of data uploaded to the third locations by the client device, and (vi) a third level of confidence that the third amounts of data correspond to the malicious upload activity.

18. A system for training a machine learning model using information pertaining to characteristics of upload activity performed at a client device, the system comprising:
a memory; and
a processing device, coupled to the memory, to:
generate training data to train the machine learning model, wherein generating the training data comprises:
generate first training input, the first training input comprising (i) information identifying first amounts of data uploaded from the client device during a specified time interval and for each of plurality of application categories, and (ii) information identifying first locations external to the client device to which the first amounts of data are uploaded, wherein each of the plurality of application categories comprise one or more applications that are installed at the client device and that upload the first amounts of data; and
generate a first target output for the first training input, wherein the first target output indicates whether the first amounts of data uploaded to the first locations correspond to malicious or non-malicious upload activity; and
provide the training data to train the machine learning model on (i) a set of training inputs comprising the first training input, and (ii) a set of target outputs comprising the first target output.

19. The system of claim 18,
wherein the first training input further comprises (iii) information identifying data categories corresponding to the first amounts of data uploaded during the specified time interval for each of the plurality of application categories; and
wherein the first target output further indicates whether the data categories corresponding to the first amounts of data correspond to the malicious or the non-malicious upload activity.

20. The system of claim 19,
wherein the first training input further comprises (iv) information identifying a frequency of upload activity that corresponds to uploading the first amounts of data during the specified time interval for each of the plurality of application categories; and
wherein the first target output further indicates whether the frequency of upload activity that corresponds to uploading the first amounts of data correspond to the malicious or the non-malicious upload activity.

21. A system for using a trained machine learning model with respect to information pertaining to characteristics of upload activity performed at a client device, the system comprising:
a memory; and
a processing device, coupled to the memory, to:
provide to the trained machine learning model first input comprising (i) information identifying first amounts of data uploaded from the client device during a specified time interval and each of a plurality of application categories, and (ii) information identifying first locations external to the client device to which the first amounts of data are uploaded, wherein each of the plurality of application categories comprise one or more applications that are installed at the client device and that upload the first amounts of data; and
obtain, from the trained machine learning model, one or more outputs identifying (i) an indication of the first amounts of data uploaded to the first locations for each of the plurality of application categories, and (ii) for each of the plurality of application categories, a level of confidence that the first amounts of data uploaded to the first locations correspond to a malicious upload activity.

22. The system of claim 21, wherein the first input further comprising (iii) information identifying data categories corresponding to the first amounts of data uploaded during the specified time interval for each of the plurality of application categories, and (iv) information identifying a frequency of upload activity that corresponds to uploading the first amounts of data during the specified time interval for each of the plurality of application categories.

23. The system of claim 21, the processing device further to:
- determine, for any of the plurality of application categories, whether the level of confidence satisfies a threshold level of confidence; and
- responsive to determining that the level of confidence for a particular application category satisfies the threshold level of confidence, perform a first remedial action with respect to the malicious upload activity associated with the particular application category.

* * * * *